Dec. 1, 1953 C. R. KEYS 2,660,802
MARKING GAUGE
Filed Aug. 2, 1951 2 Sheets-Sheet 1

INVENTOR.
CARL R. KEYS
BY Charles R. Werner
ATTORNEY

Dec. 1, 1953　　　　C. R. KEYS　　　　2,660,802
MARKING GAUGE
Filed Aug. 2, 1951　　　　　　　　　　2 Sheets-Sheet 2
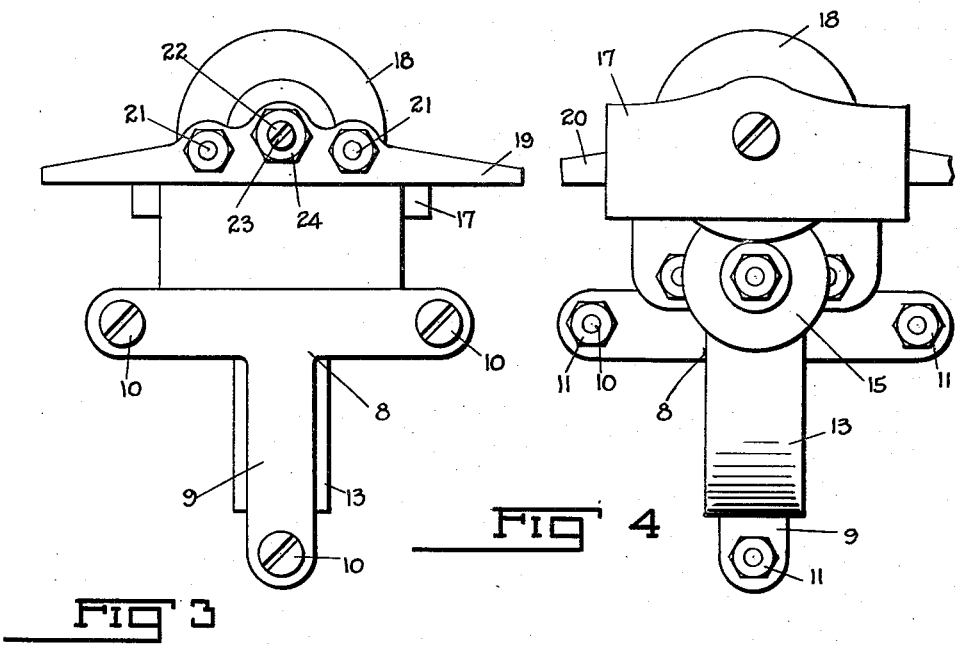
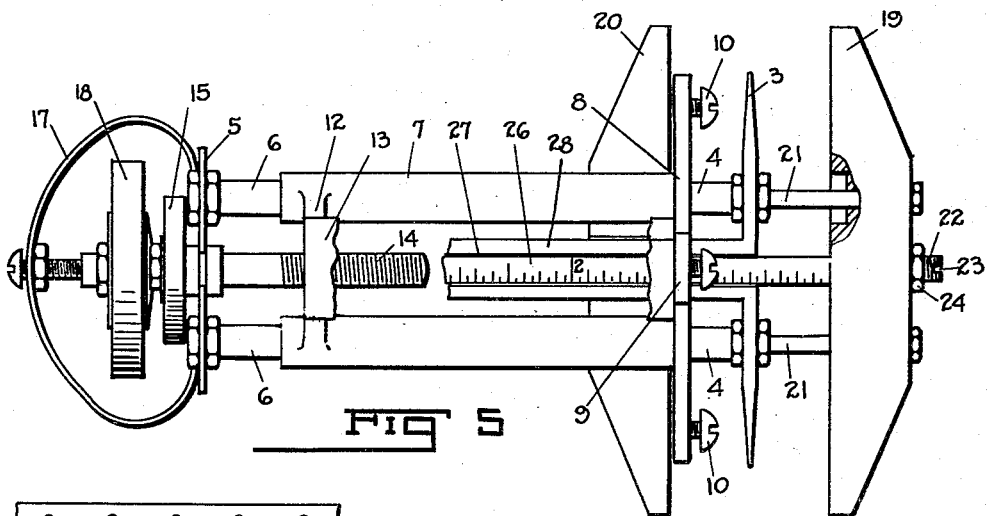
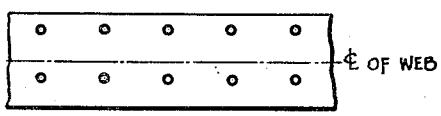
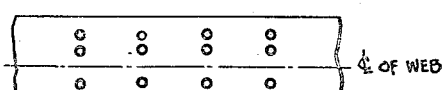
INVENTOR.
CARL R. KEYS
BY Charles R. Werner
ATTORNEY Patented Dec. 1, 1953

2,660,802

UNITED STATES PATENT OFFICE 2,660,802

MARKING GAUGE

Carl R. Keys, Denver, Colo.

Application August 2, 1951, Serial No. 239,900

9 Claims. (Cl. 33—191)

This invention relates in general to marking gauges and in particular to a marking gauge for use in locating centers of holes to be made in the flanges of I-beams and the like.

Irregularities and errors in marking for openings in various structural shapes are usually encountered due to variations in flanges along the length of the structural member, variations in web thickness and variations in distances from the web to the edge of the flange.

In structural steel work greatest accuracy can be obtained when all measurements are taken from the center of the web of the I-beam, H-beam or column or the central web or member of any structural shape. In this way variations in webs or flanges cannot affect measurements and all difficulties in assembling will be eliminated insofar as inaccuracies of measurements are concerned.

Another problem which has been encountered in structural steel layout work is that the present day devices and methods available are too slow in addition to the inaccuracies involved.

It is therefore one object of my invention to provide a marking gauge of the class described which will operate from the web of the structural member being marked so that the reference line will be the exact center line of the web at all times.

Second; to provide a marking gauge of the class described which can be used to mark points equidistant on both sides of the center line.

Third, to provide a marking gauge of the class described which can be used to mark points asymmetrical with a center line.

Fourth, to provide a marking gauge of the class described with rapid adjustment means for setting to any desired center and points symmetrical on each side of center.

Other objects and advantages as well as the construction and operation of my invention will be apparent by reference to the following description in connection with the accompanying drawings in which:

Fig. 3 is an end view of the device from the marking jaw end.

Fig. 4 is an end view of the device from the adjusting wheel end.

Fig. 5 is a fragmentary bottom plan view.

Fig. 6 is a diagrammatic view of a flange marked with two rows eccentric to the center line of the web.

Fig. 7 is a similar view with two rows marked equidistant on each side of the web of the beam.

Figure 1:
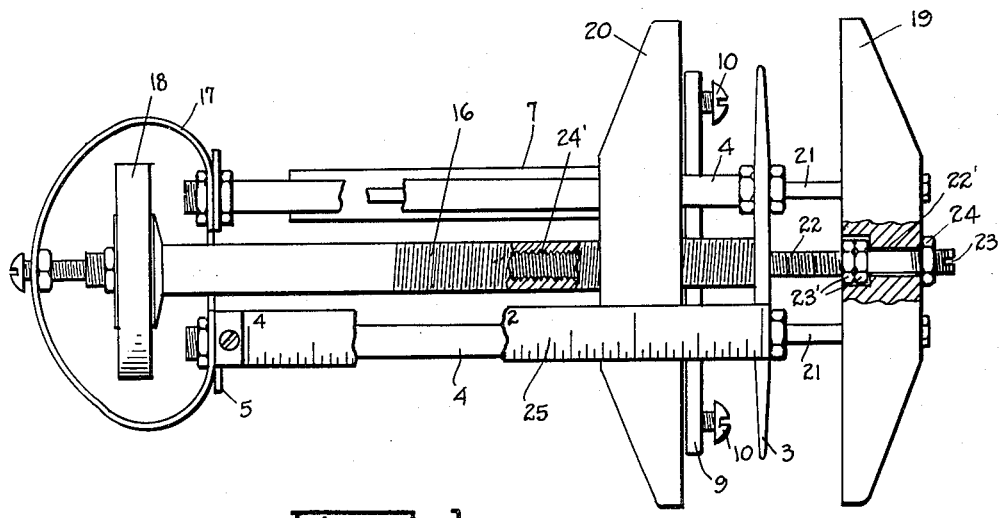
Fig. 1 is a top plan view of the marking gauge comprising my invention.
Figure 2:
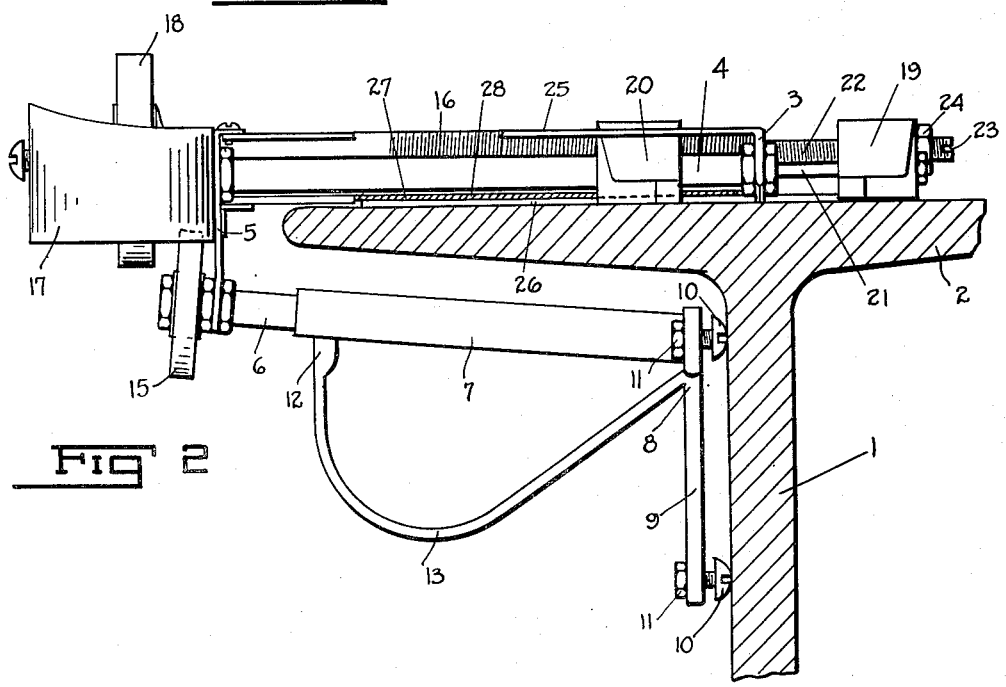
Fig. 2 is a side view of the same with a fragmentary portion of a structural shape being shown.

Referring now to the drawings by numerals of reference 1 indicates a web of any structural member with flange 2. A center line indicator 3 is fixed to one end of a pair of spaced sleeved supports 4, the other end of the supports being carried by plate 5.

A pair of spaced guides 6 project from the lower end of plate 5 in substantial alignment with supports 4 and slidably carry sleeves 7 of center line adjusting frame 8, a cross T-member 9 being provided with round head screws 10 and nuts 11 for initial setting of frame 8 and for easy sliding movement along the structural member.

Another cross member 12 braces the sleeves 7 at the end opposite the frame 8 and a reinforcing loop and handle 13 may be provided between the cross members 9 and 12.

An adjusting screw 14 threadedly engages cross member 12 and is freely rotatable but fixed against endwise movement in lower end of plate 5, said screw 14 carrying a wheel 15 preferably of a non-slip material for rapid adjustment of the center line adjustment frame by rolling said wheel along the beam or any other flat surface.

An adjusting screw 16 is rotatably mounted between center line indicator 3 and guard 17 secured to end frame 5, a wheel 18 preferably of a non-slip material mounted on screw 16 and positioned between the guard 17 and end frame 5 being adapted for rapid rotation of the screw 16 in the same manner as wheel 15.

A pair of marking jaws 19 and 20 are positioned one on each side of the center line indicator 3 and in parallel relation thereto. Jaw 19 is fixed to a pair of spaced rods 21 which are slidably supported in sleeved supports 4, the jaw 19 being adjustably fixed to a central threaded stem 22, and by means of screwdriver slot 23 and lock nut 24 may be adjusted for the purpose hereinafter specified, the stem 22 being rotatable in opening 22' of jaw 19, and locked against endwise movement with respect to the stem 22 by nuts 23'.

Jaw 20 threadedly engages external threads on the screw 16 and is supported for free movement on sleeved supports 4. The central threaded stem 22 threadedly engages internal threads 24' of adjusting screw 16, the pitch of the internal threads being opposite to the pitch of the external threads on screw 16 whereby jaws 19 and 20 will move in opposite directions upon rotation of screw 16.

A suitable scale 25 may be fixed to the center line indicator 3 and to the end frame 5 to give a continuous reading of the distance between the center line indicator and the jaw 20. Another scale 26 may be secured to the jaw 19 on the underside thereof, said scale sliding in groove 27 of longitudinal guide 28 fixed to end frame 5 and center line indicator 3 to give a reading of the distance from marking jaw 19 to the center line marking bridge 3.

In the normal operation of my device, when it is desired to mark an I-beam, for example, for openings equidistant from the center line of the web, said center line is found by placing screws 10 against one side of the web, adjusting wheel 15 until the center line indicator 3 is at the approximate center of the web on the outside surface of the flange, reversing the device to the other side of the web and dividing the distance between the two marks thus obtaining the exact center of the web regardless of size or irregularities in the flanges, the center remaining the same throughout the full length of the beam.

With the center now located, adjustment of jaws 19 and 20 to positions equidistant from the center of the web is accomplished by rotation of wheel 18, the preferable method being to roll the wheel along the beam until the approximate setting is obtained and then completing the setting by accurate hand rotation of the wheel. With the center line indicator 3 and the jaws 19 and 20 set at desired positions the marking device can now be quickly run along the beam and marks made in desired positions, said marks being at all times equidistant from the center line of the web.

On occasions it is desired to make one or more rows of eccentric markings with reference to the center line of the web. For instance, to make marks different distances from the center line as shown in Fig. 6, the center line indicator 3 may be set on the center line of the web, jaw 20 may be set at its proper position by turning wheel 18, and jaw 19 may be brought closer or farther from the center line indicator by rotation of threaded stem 22 using a screw driver in slot 23 after release of lock nut 24. After this adjustment is accomplished, sliding the marking device along one side of the web will give marks properly spaced from the center line of the web, one row being more or less distance from said center line.

In the case shown in Fig. 7 where two rows of marks are desired on each side of the center line of the web, after finding said center line, wheel 15 is adjusted until center line indicator 3 is positioned equidistant between the two rows of marks desired on the one side of the web and movement of the wheel 18 will move the jaws to the desired distance between the rows of marks. Placing the device on either side of the web will now give two rows of markings on each side of the web the corresponding rows being equidistant from the center line of the web.

From the foregoing it will be apparent that I have provided a relatively simple yet highly precision marking device for use with structural iron shapes, said device being capable of rapid, simple and accurate adjustment so that concentric or eccentric markings can be expeditiously made with respect to a web of an I-beam or the like.

It is obvious that changes in form, proportion and details of construction may be made without departing from the spirit of my invention and I reserve all rights to such changes as come within the scope of these specifications and the claims which follow.

What I claim as new and desire to secure by Letters Patent is:

1. A marking device for I-beams and similar structural shapes having a web and a flange, a center line indicator, center line indicator setting means, a slidable marking jaw on each side of the center line indicator, threaded members having opposite threads carrying the jaws and adapted to simultaneously move said jaws toward or away from each other, an adjusting wheel of a non-slip material on one of said threaded members, whereby said wheel may be run over any flat surface prior to placing the marking device in marking position for rapid adjustment of the slidable marking jaws.

2. A marking device for I-beams and similar structural shapes having a web and a flange, a center line indicator, center line indicator setting means, a slidable marking jaw on each side of the center line indicator, threaded members having opposite threads carrying the jaws and adapted to simultaneously move said jaws toward or away from each other, an adjusting wheel of a non-slip material on one of said threaded members and on the center line indicator setting means, whereby said wheels may be independently run over any flat surface for rapid adjustment of the slidable marking jaws or the center line indicator prior to placing the marking device in marking position.

3. A marking device for I-beams and similar structural shapes having a web and a flange, a side support, upper and lower lateral supports fixed to the side support, a center line indicator fixed to the ends of the upper supports remote from the side support, a center line indicator adjusting member carried by the lower lateral supports, a pair of movable marking jaws slidably carried by the upper supports, and adjusting means for the marking jaws for simultaneously moving said jaws to or away from the center line indicator.

4. The structure as specified in claim 3, and independent adjusting means for one of the marking jaws for eccentric settings of said marking jaw.

5. The structure as specified in claim 3, the upper and lower supports having a slight angular relation to each other to accommodate thick flanges of structural shapes being marked.

6. The structure as specified in claim 3, a calibrated scale fixed between the center line indicator and the side support readable from the top of the marking device, and a calibrated scale fixed to the marking jaw remote from the side support and slidably related to the center line indicator for eccentric settings of said last mentioned marking jaw.

7. The structure as specified in claim 3, said center line indicator adjusting member including a non-skid wheel on the side of the side support opposite the lateral supports whereby said center line indicator may be quickly set by running the wheel over any flat surface prior to placing the marking device in marking position.

8. The structure as specified in claim 3, said adjusting means for the marking jaws including a non-skid wheel on the side of the side support opposite the marking jaws whereby the marking jaws may be quickly adjusted by running said wheel over any flat surface prior to placing the marking device in marking position.

9. The structure as specified in claim 3, said adjusting means for the marking jaws and the center line indicator adjusting member each including a non-skid wheel on the side of the side support opposite the lateral supports whereby the marking jaws and the center line indicator may be quickly set by independently running their respective wheels over any flat surface prior to placing the marking device in marking position.

CARL R. KEYS.

References Cited in the file of this patent

UNITED STATES PATENTS

| Number | Name | Date |
|---|---|---|
| 956,116 | Lohman | Apr. 26, 1910 |
| 1,382,271 | Cunningham | June 21, 1921 |